United States Patent [19]
Aslund

[11] 3,829,222
[45] Aug. 13, 1974

[54] DEVICE TO INTRODUCE AN OPTIC MEASURING INDEX AT PHOTOELECTRIC DETECTION OF PHOTOGRAPHIC PLATES

[75] Inventor: Nils Robert Dahr Aslund, Johanneshov, Sweden

[73] Assignee: Saab-Scania Aktiebolag, Linkoping, Sweden

[22] Filed: Mar. 26, 1973

[21] Appl. No.: 344,644

[30] Foreign Application Priority Data
Mar. 27, 1972 Switzerland.......................... 3917/72

[52] U.S. Cl. .............................................. 356/203
[51] Int. Cl. .......................................... G01n 21/22
[58] Field of Search ...................... 356/77, 201–203

[56] References Cited
UNITED STATES PATENTS
3,186,295   6/1965   Cuffey .............................. 356/203

OTHER PUBLICATIONS

L'Onde Electrique, No. 446, May 1964, pages 584–588.

National Bureau of Standards Technical News Bulletin, Vol. 44, No. 6, June 1960, pages 93 and 94.

*Primary Examiner*—Ronald L. Wibert
*Assistant Examiner*—F. L. Evans

[57]   ABSTRACT

Density variation across a localized area of a photographic plate is detected by directing a beam through said area and thence onto a photoelectric detector through a narrow slot at the imaging plane. Relative motion is effected between the beam and the slot, hence detector output varies with density across the scanned zone. A fiducial mark carrier is in a separate beam (preferably emanating from the same source) which follows a path in bypass relation to the plate but which is combined with the image carrying beam at the slot. Light filters in the respective beams enable separate electronic processing of image beam signals and fiducial mark beam signals.

9 Claims, 4 Drawing Figures

DEVICE TO INTRODUCE AN OPTIC MEASURING INDEX AT PHOTOELECTRIC DETECTION OF PHOTOGRAPHIC PLATES

This invention relates generally to apparatus for scanning photographic plates for the purpose of detecting and measuring variations in density (blackness) across small selected areas of such plates; and the invention is more particularly concerned with means for producing an image of a fiducial mark, or fiducial marks, that define the center of an area being scanned.

Although the apparatus to which the present invention relates is by no means limited in its application to the study of light spectrum photographs, such study offers a rather familiar and easily understood example that facilitates an understanding of the nature and purpose of apparatus in which the invention is incorporated and of the objects and advantages of the invention.

In many types of work in chemistry and physics, light from a source under study is passed through a prism to break it into the familiar rainbow-like spectrum band, and this spectrum is photographed, usually on black-and-white film. In using such a spectrum photograph to determine the presence or absence of light of certain wavelengths, or the intensity of such light, it is necessary to measure film density (blackness) at zones of the spectrum band that correspond to light of the wavelengths that are of interest. Of course the precise location of the center of a zone or color band being studied must be known, since wavelength varies in a known manner with position lengthwise along the spectral band.

In order to evaluate film density at a selected small zone or area of the photographic plate, a light flux or beam is passed through the plate at that zone, and the beam is then caused to pass to a photoelectric detector through a scanning slot. The slot is so narrow that only a small portion of the beam — and hence of the image — is allowed to pass through it and fall upon the photoelectric detector. Relative motion is effected between the beam and the slot, in a direction transverse to the length of the slot, and thus the light responsive signal produced by the detector varies in correspondence with variations in density (blackness) of the photographic plate across the image area being scanned. If the output signals from the detector are fed to an oscilloscope, they will portray on the oscilloscope screen a profile or graph of density variation across the scanned zone.

However, there still remains the problem of defining the center of the zone being scanned, so that the exact location of that center can be specified in terms of a system of coordinates referred to the photographic plate or the image thereon. In early work with such studies or photographic plates, the plate was examined under a microscope having a set of cross-hairs that served as fiducial marks which defined the center of the area under observation. With mechanical scanning the problem arises of providing corresponding fiducial marks, and it is the general object of the present invention to solve that problem.

It is of course impracticable to delineate fiducial marks on the photographic plate itself. It is likewise impracticable to delineate them at the imaging plane, which is the plane of the scanning slot. On the other hand, if fiducial marks are to be imaged in the scanned beam by means of a fiducial mark carrier which is not at either of the planes just mentioned, then focusing problems may arise. Photographic film is somewhat supple, and has a tendency not to be perfectly flat, so that it is often necessary to make focusing adjustments to compensate for localized variations in the image plane of the film; and such adjustments should not throw the image of the fiducial marks out of focus nor require annoying readjustment of the fiducial mark carrier.

With these last mentioned considerations in mind it is another and more specific object of the present invention to provide means for defining fiducial marks for scanning apparatus of the character described, which means enables the fiducial marks to be in focus at the imaging plane notwithstanding focusing adjustments that are made to bring the image on the photographic plate into exact focus at that plane.

Another specific object of this invention is to provide means in apparatus of the character described for providing fiducial marks which very accurately define the center of an image area being scanned and for also presenting a calibration scale against which film densities can be measured.

With these observations and objectives in mind, the manner in which the invention achieves its purposes will be appreciated from the following description and the accompanying drawings, which exemplify the invention, it being understood that changes may be made in the specific apparatus disclosed herein without departing from the essentials of the invention set forth in the appended claims.

The accompanying drawings illustrate two complete examples of embodiments of the invention constructed according to the best modes so far devised for the practical application of the principles thereof, and in which.

Referring now more particularly to the accompanying drawings, the numeral 5 designates generally a machine for producing electrical signals in response to the scanning of a selected small area of a photographic plate 6. Such signals are intended to be amplified and fed to an oscilloscope or the like, for presentation as graphic displays that depict the variation in density (blackness) of the photographic plate across the small area being scanned. Since the amplifier means and oscilloscope are conventional in themselves, and are connected with the machine in a well understood conventional manner, they are omitted from the drawings for the sake of simplicity.

For purposes of example the photographic plate 6 can be regarded as bearing the image of a photographed light spectrum having horizontally spaced vertical lines or bands 7 of varying blackness, corresponding to light of different wavelengths. The plate 6 is to be studied to determine its density variation at one or more zones along the spectrum and the exact lateral positions of such zones; and for such study it is only necessary that scanning take place lengthwise of the spectrum image, in $x$ directions. However, in many other applications scanning will have to take place in mutually perpendicular directions parallel to the plate, that is, in both $x$ and $y$ directions, for determination of density variations vertically as well as horizontally. The machine of this invention therefore provides for such two-dimensional scanning, as explained hereinafter.

Figure 1:
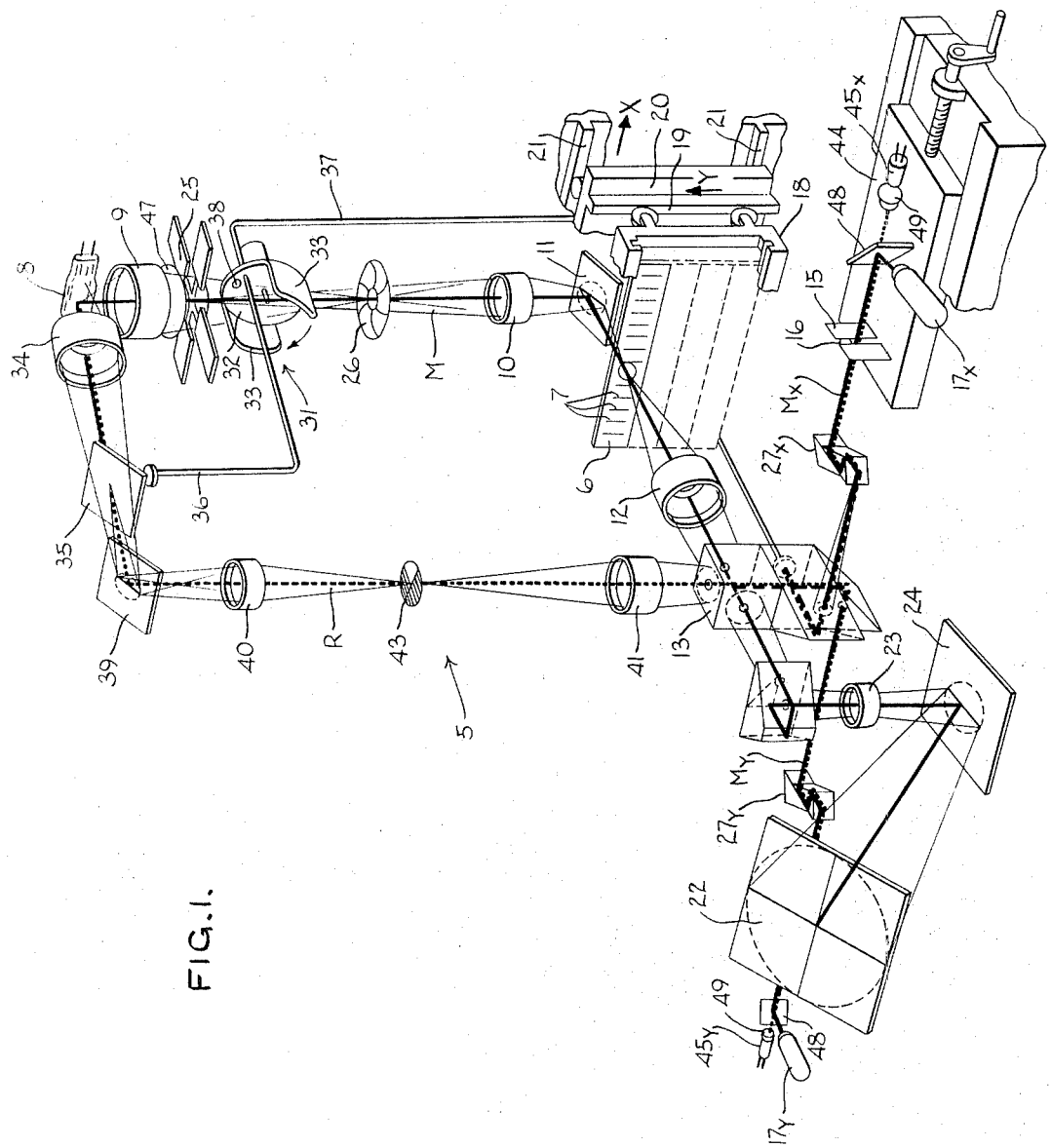
FIG. 1 is a more or less diagrammatic perspective view of a measuring machine which embodies the principles of this invention.

In general, for the purposes of the machine, light from a source 8 (a bulb energized by d.c. of regulated voltage) is collected into a rather narrow image beam M, as by means of a condenser of the Kohler type comprising two lenses 9 and 10; and by means of a mirror 11 the image beam is reflected through the photographic plate and thence through a focusing lens 12 into a reflecting device 13. The reflecting device, which can comprise so-called Abbe-cubes, divides the single incoming image beam into two image beams $M_x$ and $M_y$ that are counterparts of one another and of the image beam M through the plate 6. These image beam counterparts $M_x$ and $M_y$ are projected in laterally opposite directions. In the path of each beam $M_x$, $M_y$ is a pair of opaque plate-like members 15 that cooperate to define a narrow scanning slot 16 through which only a small part of the beam can pass. (The plate-like members 15 that define the slot 16 through which the left-hand image beam counterpart $M_y$ passes are not visible in FIG. 1.) The portion of each image beam $M_x$, $M_y$ that passes the slot 16 ultimately reaches a photoelectric detector, the detector for the beam counterpart $M_x$ being designated $17_x$, that for the beam counterpart $M_y$ being designated $17_y$.

To permit edgewise adjustment of the photographic plate 6 so that any desired small area on it can be brought into register with the image beam M, the plate is detachably mounted on a carriage 18 that is movable along coordinate axes parallel to the plane of the plate. Thus the carriage is slideable up and down (in $y$ directions) along vertically extending rails 19 on a table 20, and the table 20 is in turn slideable from side to side (in $x$ directions) on fixed horizontally extending rails 21. It will be understood that $x$ and $y$ position sensors (not shown) associated with the carriage 18 and the table 20 provide for an accurate readout of the exact position of the carriage in terms of a coordinate system, and hence provide for identification of the precise point on the plate that is at the center of the image beam through it.

The reflecting device 13 has a third exit for light, whereby another counterpart of the image beam M that has passed through the plate 6 is brought to focus upon a translucent screen 22 by means of a lens 23 and a mirror 24. An operator can thus see on the screen 22 the image of the entire localized area on the plate 6 that is intersected by the image beam, and by reference to that image can move the plate to a position at which a desired zone or portion thereof will be under study.

The size of the localized zone of the plate that is traversed by the image beam is controlled by a so-called front slot 25 which is mounted between the two condenser lenses 9 and 10; and the intensity of the beam through the plate is controlled by an aperture diaphragm 26 which is also mounted between those lenses.

As mentioned above, each scanning slot 16 is so narrow as to pass only a small strip of the total image beam counterpart $M_x$ or $M_y$. Hence scanning can be accomplished by effecting relative motion between the image beam counterpart and the scanning slot in a direction transverse to the length of the slot. During such scanning the intensity of light falling upon the detector $17_x$ or $17_y$ will vary with variation in the density of the photographic plate 6 across the zone being scanned; and if scanning is conducted at a regular frequency, the output of the detector can be impressed upon an oscilloscope to provide a graph-like depiction or profile of the varying densities across that zone.

In the present case it is preferred to accomplish scanning by moving the image beam counterpart while maintaining the scanning slot 16 stationary. To this end the respective beam counter parts $M_x$ and $M_y$ are passed through movable prisms $27_x$, $27_y$ which are mounted for back and forth reciprocation at a steady rate, whereby said beams are translated or swung back and forth in directions transverse to the slot length.

In the particular machine here illustrated, the two movable prisms $27_x$ and $27_y$ reciprocate along parallel paths, in unison with one another. Since motion of the prism $27_x$ is employed for horizontal scanning and motion of the prism $27_y$ is employed for vertical scanning, the image carried by the image beam counterpart $M_y$ corresponds to a 90° rotation of the beam $M_x$, i.e., the beam $M_y$ is like the beam $M_x$ laid on its side. Such rotation of the $M_y$ beam is provided for in the reflecting device 13. The respective horizontal and vertical scan outputs of detectors $17_x$ and $17_y$ can be fed to two different oscilloscopes or may be combined in a suitable manner and fed to a single oscilloscope, depending upon the nature and purpose of the information sought with the use of the machine.

The profile or graph-like portrayal of density variation that appears on the oscilloscope screen, taken by itself, denoted only relative densities across the scanned zone. But for many purposes it is also necessary to have information about an absolute density value at some point in the scan, or at several points across the scan. This is to say that it is desirable to provide a scale or calibration by which the graphic plot of density variation can be measured in some sort of absolute units, and the components of the machine now to be described serve that purpose. For a more detailed explanation of this portion of the apparatus, reference may be made to the copending application of N. R. D. Aslund et. al., Ser. No. 347,417, filed Apr. 3, 1973, which has a common assignee herewith.

The image beam M that passes through the plate 6 is interrupted at regular time intervals, for uniform periods, by means of a chopper 31 that is mounted between the condenser lenses 9 and 10. As here shown, the chopper comprises a rotatable disc 32 that is spaced to one side of the image beam M and has its axis transverse to the axis of that beam. Concentric curved wall portions 33 project from the disc 32 in one axial direction and extend partway around it, to intercept and block the image beam during portions of each revolution of the chopper. Suitable drive means (not shown) effect rotation of the chopper preferably in synchronism with oscillation of the scanning prisms $27_x$, $27_y$ so that the scanning prisms make a whole oscillation stroke (or a whole number of oscillation strokes) during each interval that the chopper permits light from the bulb 8 to pass through the plate 6.

During the intervals that the image beam M is cut off by the chopper, a pulsed calibration light flux of constant intensity is fed to the detectors $17_x$, $17_y$, to produce on the oscilloscope screen a calibration pulse presentation which appears alongside the graphic presentation of plate density variation and which serves as a scale to which density values on the density presentation can be referred.

The pulsed calibration flux is produced by means of a condenser lens 34 and a half-silvered mirror 35 that are aligned with the light bulb 8 to project light therefrom into one end of a fibre optic element or rod 36. The other end of the fibre optic rod 36 is directly adjacent to one face of the chopper disc 32. Another fibre optic rod 37 has one end adjacent to the other face of the chopper disc, in alignment with the fibre optic rod 36, and extends to the Abbe-cube reflecting means 13. The chopper disc has in it a small aperture or window 38 that comes into register with the fibre optic rods once during each revolution of the chopper, permitting light to pass from the rod 36 to the rod 37. Such registration of the window 38 with the fibre optics occurs during a time when the image beam M through the plate 6 is cut off by the chopper.

From the fibre optic rod 37, the calibration flux takes the same path to the detectors $17_x$, $17_y$ as does the image beam M, except that the calibration flux is not directed onto the translucent screen 22. Hence in that part of each chopper cycle during which the image beam is blocked from the detectors $17_x$, $17_y$, each of those detectors emits a calibration pulse of short duration and of predetermined amplitude.

In addition to having a calibrating indication by reference to which magnitudes of the image signal can be estimated or read, it is also necessary that there be an indication, on the image signal presentation, of the center of the scanned zone, so that the density variation being studied can be referred to an accurately identified point on the image-bearing plate 6 that corresponds to the center of the beam through that plate.

According to the present invention, fiducial marks are projected onto the reflecting means 13 by means of a reference beam R that follows a path between the lamp 8 and the reflecting means 13 which is separate from that of the image beam M and which is in bypassing relation to the plate 6.

The reference beam originates with that part of the light from condenser lens 34 which passes through the half-silvered mirror 35. By means of an oblique mirror 39 such light is projected through a second condenser lens 40 and thence through a focusing lens 41 located near an entrance to the reflecting means 13. Fixed at a location between the lenses 40 and 41 is a disc 43 that serves to produce the fiducial mark image, and which could carry cross hairs but preferably comprises means defining another type of fiducial indicia described hereinafter.

By means of the lens 41 the image of the fiducial marks is brought to a sharp focus on the image planes for the image beams $M_x$, $M_y$, which planes are at the scanning slots 16; hence the image of the fiducial marks is superimposed upon the object image as the latter is being scanned. The image of the fiducial marks is also superimposed upon the object image at the viewing screen 22, so that the operator can make such edgewise adjustments of the plate 6 as will bring the center of the zone to be investigated into coincidence with the center point denoted by the fiducial marks.

Since the fiducial mark disc 43 and the lens system for the reference beam R that it intersects are in fixed relation to one another, there is no occasion for the fiducial mark image to get out of focus, although if any focusing adjustment should be necessary, it can of course be made without disturbing the focus of the image beam system. Conversely, and more importantly, any desired focusing adjustments can be made in the image beam system without disturbing the sharp focus of the fiducial marks.

Preferably adjustments for focus of the photographic image are made by moving a table or carriage 44 that carries each pair of slot defining members 15 and their associated detector $17_x$ or $17_y$, such table being guided for motion in the direction lengthwise of the image beams $M_x$, $M_y$. In that case the reference beam channel can be made telecentric, and the depth of focal field of the fiducial mark carrier can be made greater than that of the photographic image so that sharp focusing of the photographic image will at most effect a negligible refocusing of the fiducial mark image.

If the light from both the reference beam R and the image beam M were picked up by the detectors $17_x$ and $17_y$, the output of each of those detectors would be a sum signal. However, in accordance with the invention it is preferred to separate the two types of beams at detection, so that two types of signals are produced that can be processed separately in the electronic circuits to which the detectors have input connections.

For the purposes of such signal separation there is a second set of photoelectric detectors $45_x$, $45_y$, each aligned with one of the beam paths $M_x$, $M_y$, and optical filtering means are used to render the detectors $45_x$, $45_y$ responsive only to the reference beam R and the detectors $17_x$, $17_y$ responsive only to the image beam M. Thus the transparent portion of the disc 43 on which the fiducial marks are delineated can comprise a red filter, while a blue filter 47 can be placed in the image beam path M, at or near the condenser lens 9. Correspondingly, each of the detectors $17_x$ and $17_y$ for the image channels can be a photo multiplier which has great sensitivity to blue light and which can receive light from its image channel that is reflected into it by way of a half-silvered mirror 48, while each of the detectors $45_x$, $45_y$ for the reference channel can be a photo-diode which is responsive to the longer wavelength red light that passes through the half-silvered mirror. Of course the detectors could all have similar curves of spectral sensitivity, in which case the respective beams would pass to them through suitable filters as denoted by the filter 49 in the reference beam channels, through which the reference beams pass to the detectors $45_x$, $45_y$.

Each of the reference channel detectors, $45_x$, $45_y$ can be carried by the table or carriage 44 that carries its corresponding scanning slot 16 and image channel detector $17_x$ or $17_y$; and the half-silvered mirror 48 that is associated with each of those detector sets can likewise be mounted on the table that carries them.

Since the image of the fiducial marks is scanned in synchronism with scanning of the photographic image, but produces signals which can be processed separately, it will be evident that the fiducial mark signals can serve as reference pulses that can be utilized in suitable electronic apparatus to make a comparison between the photographic image signal contents at opposite sides of the centerlines defined by the fiducial marks. Such comparison can be made in a manner to produce an error signal having a magnitude and sign corresponding to the difference between compared photographic image signal contents, and the error signal can, in turn, be fed to suitable servo means (not shown) by which the carriage 18 can be automatically moved to bring the center of the image beam M into exact coincidence with the center of an area of contrast on the photographic plate 6 that is the object of study. In this way the exact center of any such area of contrast can be rapidly and automatically ascertained from a reading of the coordinates of the carriage position when the error signal becomes zero and the carriage 18 comes to rest.

A hairline fiducial mark such as is defined by conventional cross hairs has a finite width, and in that respect it tends to define a more or less indefinite zone rather than a truly dimensionless line or point. With the present invention it is possible to provide a fiducial mark presentation which denotes an instantaneous change in signal level and which thus corresponds to a dimensionless line or point. To this end, if determinations of image density and position need be made in only one pair of coordinate directions, as with spectrophotographic studies, the fiducial mark carrier can consist, in the simplest case, of an opaque element having a sharp straight edge, so that an instantaneous change in fiducial mark signal level occurs as the scan passes that edge. Where scanning takes place in two coordinate pairs of opposite directions, the fiducial marks can be delineated by an opaque quadrant, which thus presents two straight edges that are perpendicular to one another.

Figure 2:
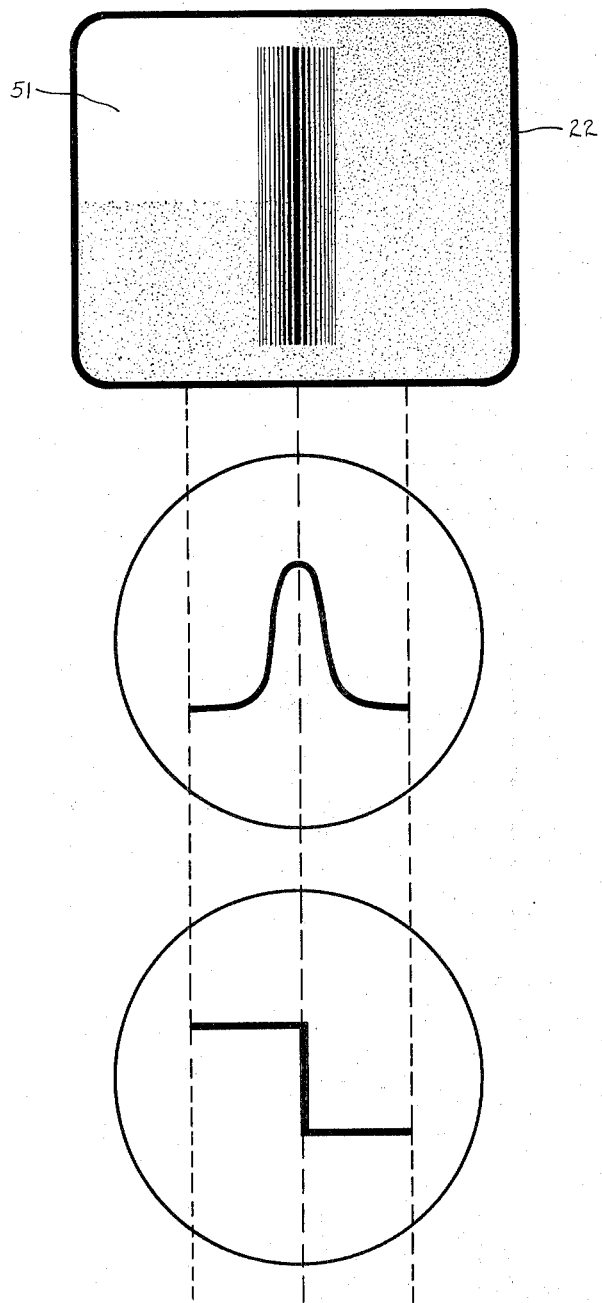
FIG. 2 illustrates a portion of a scanned photographic image and fiducial mark image as these are seen on a projection screen of the measuring machine, shown in relation to oscilloscope presentations produced with the machine in response to signals from the scanned image.

FIG. 2 depicts in its top drawing the image that will appear on the projection screen 22 when the photographic image area under study is part of a photographed light spectrum and the fiducial marks are denoted by an opaque quadrant, the image of that quadrant being designated by 51. The middle drawing in FIG. 2 shows the presentation that will appear on the oscilloscope screen connected with the image scan detector 17$_r$, and which is a profile or graph-like depiction of density variation across the zone of the plate that is being scanned. The bottom drawing represents the presentation on an oscilloscope to which the fiducial mark detector 45$_x$ is connected, showing the abrupt change in signal level as the vertical edge of the opaque quadrant is passed during the course of a horizontal scan.

Figure 3:
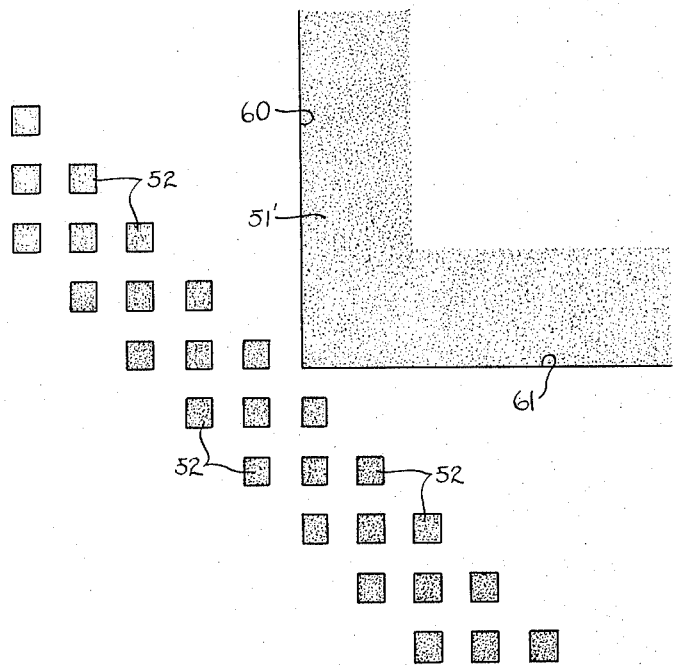
FIG. 3 is an example of another type of fiducial indicia that can be used with the machine.

Another arrangement for delineating fiducial marks which can also serve as a calibration scale is depicted in FIG. 3, wherein the shaded areas represent transparent portions of the fiducial mark carrier disc. In this case the disc has a transparent quadrant 51', the straight edges 60 and 61 of which again extend at right angles to one another and meet at a point that defines the center of the image beam M. In addition, the fiducial mark disc also has rows of uniform small square holes or transparencies 52, each of which has its edges parallel to the edges 60 and 61. The rows of squares extend parallel to the edges 60 and 61, and since the squares are spaced apart by uniform distances they are also aligned in rows transverse to a bisector of the right angle defined by the edges 60 and 61. There are a uniform number of square holes in each row, parallel to an edge 60 or 61, inasmuch as the rows of holes are in an overall stepped arrangement. Note that there are certain holes opposite each of the edges 60 and 61.

In scanning across this fiducial mark image, in either coordinate direction parallel to edge 60 or 61, the scan across each row of squares produces a pulse signal, and the several pulse signals all have uniform amplitude and duration, with uniform intervals between pulses. At one side of the centerline the scan crosses an edge 60 or 61 of the quadrant 51', as well as squares, and the constant intensity signal that is due to the quadrant is added to the pulse signal that is due to the squares, producing a net signal presentation such as is represented by FIG. 4.

Figure 4:
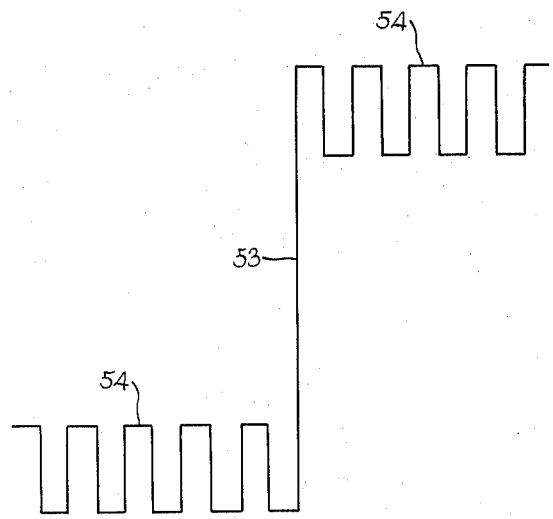
FIG. 4 represents the electric signal obtained with the use of the fiducial indicia illustrated in FIG. 3.

The change in signal level due to the scan crossing an edge of the quadrant 51' is depicted in FIG. 4 by the vertical line 53, and the pulses due to the square holes 52 are denoted by 54. Since the pulses 54 are of uniform amplitude and width, they can be used as calibrations for measurement of density values, either as a supplement to, or as a substitute for, the pulses produced by means of the apparatus comprising the fibre optics 36 and 37 and the chopper 31. Specifically, the pulses define a scale of distances across the film surface to which variations in density values can be related, to aid in positioning the film carriage 18 and in otherwise determining the relative positions on a photographic plate of areas of contrast that are of interest.

From the foregoing description taken with the accompanying drawings it will be apparent that this invention provides means in an automatic device for determining density variations across a selected small area of a photographic plate whereby a representation of fiducial marks denoting the center of an area being scanned can be superimposed upon the image being scanned, and whereby adjustments can be made to the focus of the image being studied without affecting the focus of the image of the fiducial marks.

I claim:

1. Apparatus for producing electrical signals that correspond to variations in density detected during scanning of a small area of a photographic plate and by which the location on the plate of a particular part of such an area can be accurately ascertained, which apparatus comprises means for directing a first beam of light, of one spectral composition, along a defined path through a localized area of a photographic plate and through lens means for bringing the beam to a focus at an imaging plane, means at the imaging plane defining a scanning slot in said defined path, a photoelectric detector in said path upon which falls that portion of the beam that passes through the scanning slot and which is responsive substantially only to light of said one spectral composition and produces an electrical output that corresponds to the intensity of such light falling upon it, means for directing a second beam of light, of a substantially different spectral composition, along a second defined path having one part which is in bypassing relation to the photographic plate and which traverses means for producing an image of a fiducial mark and having another part which coincides with a part of the path of the first beam and extends through the scanning slot, another photoelectric detector, responsive substantially only to light of said different spectral composition and arranged to receive light of said second beam that has passed through said scanning slot, and means for effecting periodic relative motion between said beams and the scanning slot means in directions transverse to the length of the scanning slot, said apparatus being characterized by:

A. said means for producing an image of a fiducial mark comprising an element that has at least one opaque area and at least one transparent area, said areas being contiguous to one another along a line parallel to the scanning slot;

B. means for effecting relative adjustment between the scanning slot and said lens means so that an image on any area of a photographic plate through which said first mentioned beam passes can be brought to focus at the plane of the scanning slot notwithstanding lack of flatness in the photographic plate; and C. other lens means in said one part of the second defined path for bringing the image of the fiducial mark to a focus at the plane of the scanning slot independently of the focus of the image carried by the first mentioned beam.

2. The apparatus of claim 1, further characterized by:

1. said means for effecting relative adjustment between the scanning slot and the first mentioned lens means comprising means for adjusting said scanning slot means in directions along said part of the path of the first beam; and 2. said other lens means having a substantially large depth of focal field, such that the image of the fiducial mark is in focus at the scanning slot in all positions of adjustment of the scanning slot means along said part of the path of the first beam.

3. The apparatus of claim 1, further characterized by:

D. means comprising beam dividing means defining a branch path portion for each of said two beams and in at least a part of which the two beams coincide;

E. means defining a second scanning slot in said part of said branch path portion and at a second imaging plane, said second scanning slot being oriented transversely to the first mentioned scanning slot relative to the images carried by the beams;

F. means for bringing to a focus at said second imaging plane the images carried by both of said two beams;

G. means for effecting periodic relative motion between said second scanning slot means and said beams in said part of said branch path portion, in directions transverse to the length of said second scanning slot; and H. said opaque and transparent areas of said element being also contiguous to one another along a line perpendicular to the first mentioned line so that one of said areas is quadrant-like.

4. The apparatus of claim 1, further characterized by:

E. semi-reflector means between the scanning slot and the detectors for forming a pair of counterparts of the coinciding beams and directing each of said counterparts to one of the photoelectric detectors.

5. The apparatus of claim 2, further characterized by:

said fiducial mark image producing means comprising an element that has areas of a kind to block light, the remaining areas of said element being of a kind to pass light, the areas of said element that are of one of said kinds being arranged in the form of 1. a fiducial mark defining zone of substantially large extent having a pair of straight edges that are at right angles to one another, and 2. a plurality of uniform substantially smaller squares, each having its edges parallel to said edges of the fiducial mark defining zone, said squares being spaced from one another at uniform intervals and being arranged in uniform rows that extend parallel to both of said edges of the fiducial mark defining zone.

6. The apparatus of claim 5, further characterized by:

said squares being so arranged as to also be in rows which extend perpendicularly to the bisector of the right angle defined by said edges of the fiducial mark defining zone, and certain of said squares being opposite at least one of the last mentioned edges.

7. The apparatus of claim 6, wherein each of the last mentioned rows of squares extends substantially equal distances to opposite sides of said bisector so that there are squares opposite both of said last mentioned edges.

8. Apparatus wherein light from a light source is directed in a beam through a small area of a photographic plate and thence onto photo-responsive detector means for producing signals corresponding to variations in density across said area of the photographic plate, said apparatus being characterized by:

A. means for bifurcating said beam into a pair of beam components and directing each beam component along one of a pair of path portions in each of which there is an imaging plane at which the beam component is in focus;

B. means at each imaging plane defining a scanning slot in said defined path through which the beam component passes to detector means, one of said scanning slots being transverse to the other relative to the image carried by the beam components;

C. means for directing a second beam of light through means for producing an image of a fiducial mark;

D. means for bifurcating said second beam and for directing its bifurcated components along path portions that coincide in substantial part with said path portions of the first mentioned beam, through the respective scanning slots and with the bifurcated components of the second beam in focus at said imaging planes; and E. means for effecting periodic relative motion between each of the scanning slot means and the beam components passing therethrough, in directions transverse to the length of the scanning slot.

9. The apparatus of claim 8, further characterized by:

F. said fiducial mark image producing means comprising an element having an opaque area with a pair of sharply defined straight edges that are at right angles to one another so that a scan transverse to each such edge causes a sharply defined change in output level as the scan crosses the edge, to define a fiducial mark, and such changes occur in both directions of scanning.

* * * * *